I. M. REED.
DRAG FOR TURN PLOWS.
APPLICATION FILED JAN. 18, 1917.
1,245,969.
Patented Nov. 6, 1917.
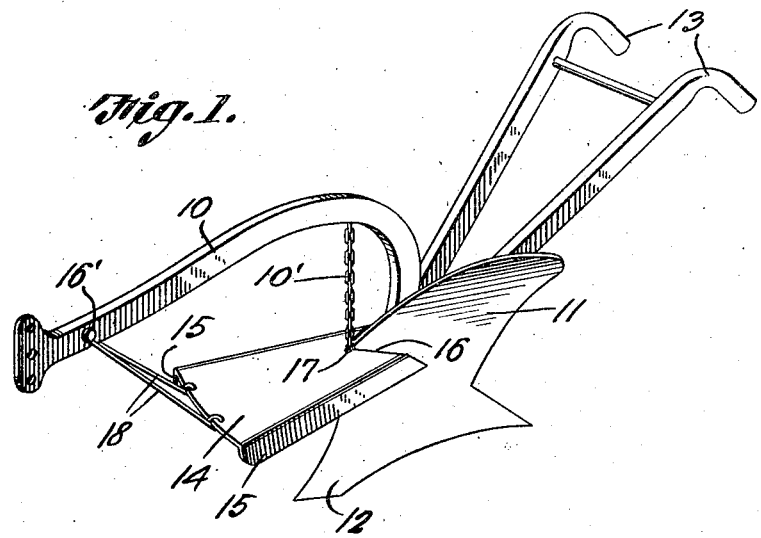
Fig. 1.
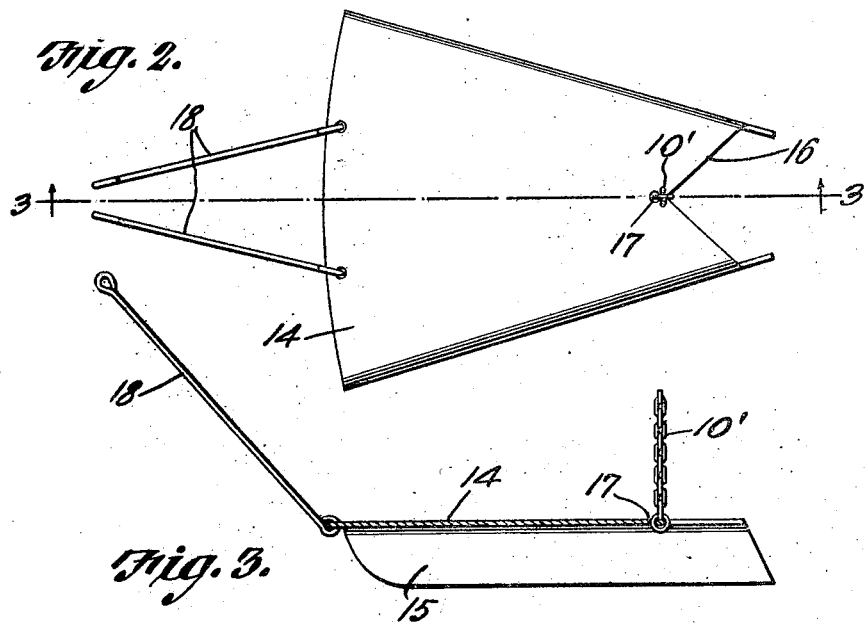
Fig. 2.
Fig. 3.
Inventor
Ira M. Reed
By Jalbert & Parker
Attorney

UNITED STATES PATENT OFFICE.

IRA M. REED, OF WILLIAMSTOWN, WEST VIRGINIA.

DRAG FOR TURN-PLOWS.

1,245,969.  Specification of Letters Patent.  Patented Nov. 6, 1917.

Application filed January 18, 1917. Serial No. 143,130.

*To all whom it may concern:*

Be it known that I, IRA M. REED, a citizen of the United States, residing at Williamstown, in the county of Wood and State of West Virginia, have invented certain useful Improvements in Drags for Turn-Plows, of which the following is a specification, reference being had therein to the accompanying drawing.

The present invention relates to a plow attachment, and has for an object to provide a device for uprooting and collecting plants and the like and depositing them in front of a turn plow so that the plants may be buried for the purpose of fertilizing the field.

Another object of the present invention is to provide a device which not only uproots the plants but which will also collect them and deliver them in front of the plow so that as the latter turns over the earth the plants will be covered.

A still further object of this invention is to provide a device of this nature which is simple in construction, and which requires practically no adjustment when once applied to the plow beam.

The above and other objects and advantages of this invention will be brought out more specifically in the detailed description of the present embodiment of this invention, the same being illustrated in the accompanying drawing, wherein—

Figure 1 is a perspective view of a plow having a drag constructed according to this invention applied thereto;

Fig. 2 is a detail top plan view of the drag;

Fig. 3 is a longitudinal section through the drag.

Referring to this drawing, 10 designates the beam of an ordinary turn plow provided with the usual moldboard 11 and point 12. The plow also has the handles 13 for controlling the movement of the plow.

The drag of this invention comprises a relatively flat body 14 which is preferably made from sheet metal, which tapers in width from front to rear, and which has its lateral edges turned downwardly to provide cutting and collecting flanges 15. The rear end of the body 14 is provided with a recess which is substantially V-shaped, as shown at 16, to receive the forward edge of the moldboard 11 and the standard or lower end of the beam 10 therein. If desired, the body 14 may be provided with an aperture 17 at the inner end of the recess 16 to receive a chain 10' which is suspended from the beam 10 immediately over the rear end of the drag.

The forward end of the drag is provided with a pair of connecting rods 18 which are hingedly connected to the body 14 near the lateral edges thereof, and which are adapted for securement in hinged relation against the opposite sides of the beam 10 by means of a bolt 16'.

In operation, when the plow is drawn forwardly the drag engages plants and uproots the same and rolls the plants inwardly, collecting them at the rear of the drag immediately in front of the plow. In this manner, the drag of this invention not only uproots the plants but it also collects or bunches them immediately beneath the moldboard and in position to be fully covered by the overturned earth.

The drag may be made from a single sheet of relatively heavy metal which may be easily stamped to the desired form and bent to provide the depending flanges 15, the flanges 15 serving to engage the plants and tear the roots of the same upwardly from the ground or cut the plants off if too much resistance is offered. These flanges 15 also serve the purpose of throwing the plants inwardly into line with the center of the plow.

The hinged rods or links 18 admit of the automatic adjustment of the drag to various depths to which the plow may be inserted in the earth, and also to various heights of plants which are adapted to be uprooted.

It is of course understood that various changes and modifications may be made in this specifically described construction without departing from the spirit of the invention, and being restricted only by the scope of the following claims.

Having thus described my invention, I claim:

1. The combination with a plow having the usual beam and moldboard and point carried by the beam, of a relatively flat body, hinged links connected to the forward end of the body and adapted for attachment to the beam forwardly of the point of the plow, said body being provided with a recess in its rear end adapted to receive the plow standard therethrough and having lateral down-turned flanges to uproot and collect plants in the path of the plow.

2. The combination with a plow having a beam, a moldboard and a point, of a relatively flat body adapted for positioning beneath the beam, a flexible connection between the forward end of the body and said beam in front of the point, said body having lateral down-turned flanges adapted to engage and uproot plants, said body tapering in width from front to rear to deflect the plants in the path of the moldboard.

In testimony whereof I affix my signature.

IRA M. REED.

Copies of this patent may be obtained for five cents each, by addressing the "Commissioner of Patents, Washington, D. C."